United States Patent
Li

(10) Patent No.: US 11,633,984 B2
(45) Date of Patent: Apr. 25, 2023

(54) METHOD FOR PREPARING MODIFIED RUBBER, MODIFIED RUBBER, AND BULLETPROOF AND PUNCTURE RESISTANT TIRE

(71) Applicants: Zhejiang Geely Holding Group Co., LTD., Hangzhou (CN); Zhejiang Geely Automobile Research Institute Co., LTD., Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 669 days.

(21) Appl. No.: 16/626,286

(22) PCT Filed: Jul. 20, 2018

(86) PCT No.: PCT/CN2018/096352
§ 371 (c)(1),
(2) Date: Dec. 23, 2019

(87) PCT Pub. No.: WO2019/019953
PCT Pub. Date: Jan. 31, 2019

(65) Prior Publication Data
US 2020/0114685 A1    Apr. 16, 2020

(30) Foreign Application Priority Data
Jul. 26, 2017    (CN) .......................... 201710619579.3

(51) Int. Cl.
*C08J 5/06* (2006.01)
*B60C 1/00* (2006.01)
(Continued)

(52) U.S. Cl.
CPC ............ *B60C 1/0041* (2013.01); *B60C 19/12* (2013.01); *C08J 5/046* (2013.01); *C08J 5/06* (2013.01);
(Continued)

(58) Field of Classification Search
CPC ........... C08J 5/046; C08J 5/06; D06M 10/001
See application file for complete search history.

(56) References Cited

U.S. PATENT DOCUMENTS

2014/0138004 A1* 5/2014 Voge ................. B29D 30/0685
524/426
2020/0370237 A1* 11/2020 Kanbargi ................. D02J 1/22

FOREIGN PATENT DOCUMENTS

CN    201856586 U    6/2011
CN    102465448 A    5/2012
(Continued)

OTHER PUBLICATIONS

CN 105986465 machine translation (Year: 2016).*
(Continued)

*Primary Examiner* — Timothy Kennedy
*Assistant Examiner* — Alexander A Wang
(74) *Attorney, Agent, or Firm* — Cheng-Ju Chiang

(57) ABSTRACT

A method for preparing a modified rubber introduces a reactive group into a high-performance short fiber by irritating the short fiber by ultraviolet light, and modifies the short fiber by a coupling agent to increase the compatibility of the short fiber with a rubber matrix, and finally, utilizes the charge repulsion of sodium lauryl sulfate to effectively avoid the agglomeration of the short fibers in the rubber matrix, which is benefit for obtaining the modified rubber. The present disclosure further provides a modified rubber prepared by the method and a bulletproof and puncture resistant tire prepared by the modified rubber, wherein a
(Continued)

buffer layer is made by the modified rubber, and at least one of a tread, a belt ply and an inner liner is made by the modified rubber, and a cord ply is woven by twisted high-performance long fibers.

11 Claims, 1 Drawing Sheet

(51) Int. Cl.
 *B60C 19/12* (2006.01)
 *C08J 5/04* (2006.01)
 *D06M 10/00* (2006.01)
(52) U.S. Cl.
 CPC ... *D06M 10/001* (2013.01); *B60C 2001/0075* (2013.01)

(56) References Cited

FOREIGN PATENT DOCUMENTS

| | | |
|---|---|---|
| CN | 103146346 A | 6/2013 |
| CN | 105143318 A | 12/2015 |
| CN | 105164194 A | 12/2015 |
| CN | 105986465 A | 10/2016 |
| CN | 106928514 A | 7/2017 |
| CN | 107501581 A | 12/2017 |
| EP | 2058370 A1 | 5/2009 |
| EP | 2975077 A1 | 1/2016 |
| EP | 2975084 A1 | 1/2016 |
| JP | H4-349301 A | 12/1992 |
| JP | 2005-60418 A | 3/2005 |
| JP | 2011-153222 A | 8/2011 |
| JP | 2012-241831 A | 12/2012 |
| WO | 2009/060067 A1 | 5/2009 |
| WO | 2014/142316 A1 | 9/2014 |
| WO | 2014/142319 A1 | 9/2014 |
| WO | 2017/031308 A1 | 2/2017 |
| WO | 2017/065304 A1 | 4/2017 |

OTHER PUBLICATIONS

Jun Dai, Yu-Zhu Xiong, Ling-Feng Cui, Xin Li, Bing-Hui Wang, Sheng-Xue Wu, "Study on Modification of Aramid Fiber by UV Irradiation", Journal of Synthetic Crystals, Nov. 2016, pp. 2705-2710, 2716 ,vol. 45, Issue No. 11, China.

* cited by examiner

METHOD FOR PREPARING MODIFIED RUBBER, MODIFIED RUBBER, AND BULLETPROOF AND PUNCTURE RESISTANT TIRE

CROSS-REFERENCE TO RELATED APPLICATION

The present application is a 35 U.S.C. § 371 National Phase conversion of International (PCT) Patent Application No. PCT/CN2018/096352, filed on Jul. 20, 2018, which is based on and claims priority of Chinese Patent Application No. 201710619579.3, filed on Jul. 26, 2017, applied by Zhejiang Geely Holding Group CO., Ltd. and Zhejiang Geely Automobile Research Institute Co., Ltd., and entitled "METHOD FOR PREPARING MODIFIED RUBBER, MODIFIED RUBBER, AND BULLETPROOF AND PUNCTURE RESISTANT TIRE". The entire disclosure of the above to identified application, including the specification and claims are incorporated herein by reference in its entirety. The PCT International Patent Application was filed and published in English.

TECHNICAL FIELD

The present disclosure relates to composite materials used in automobiles, and more particular to a method for preparing a modified rubber, a modified rubber and a bulletproof and puncture resistant tire.

BACKGROUND ART

Tire is a ground-rolled, circular elastic rubber article being assembled on various vehicles or machinery. It is usually mounted on a metal rim to support the vehicle body, absorb external impacts, achieve contact with the road surface and ensure the driving performance of the vehicle. Tires are often used in complex and harsh conditions. For example, they are subjected to various deformations, loads, forces and high and low temperatures during driving. Furthermore, they must have properties of high load-bearing, traction and cushioning. Intricate terrain and wartime requirements for wheeled vehicles generate an urgent need to develop a new type of bulletproof and puncture resistant tire. The existing bulletproof tires mainly include perfusion-type solid tires, inner support tires, and inner-sinking limiter tires. For the perfusion-type solid tires, due to the large weight of the tire, the running resistance of the tire is accordingly large, which affects the driving speed of the vehicle and results a high fuel consumption of the vehicle, so that the requirements for the power system of the vehicle are relatively high. The main disadvantages of the inner support tire and the inner-sinking limiter tires are discussed as follows. The first is, if the support body or the inner limiter bears the vehicle load after vehicle damage, the tire will have a certain amount of subsidence, which will result a height difference between the wheels and further result a poor riding comfort of the vehicle. The second is the requirement to use special rims and the third is that when the support body is assembled to the tires and the rims, special equipments for mounting the tires are needed.

High-performance fiber is a chemical fiber with special physical and chemical structure, special properties and applications, or special functions. It has the advantages of low density, high strength, good toughness, high temperature resistance, easy processing and molding, and its strength is at least 5 times of the same quality of steel, but the density is only one-fifth of the steel, that is, it is a material with high strength and light weight.

Technical Solution

The embodiments of the present disclosure provide a method for preparing a modified rubber, a modified rubber and a bulletproof and puncture resistant tire, in order to solve the problem that the existing bulletproof tire has a large weight and poor riding stability.

The present disclosure provides a method for preparing a modified rubber, including the steps of:

irradiating high-performance short fibers by ultraviolet light, adding the irradiated high-performance short fibers to ethanol and stirring to prepare a uniformly dispersed fiber suspension;

adding a coupling agent to the prepared fiber suspension, adjusting a pH value of the fiber suspension to a range from 8 to 9, and waiting components in the fiber suspension to react at room temperature for 2 to 4 hours;

adding sodium dodecylbenzenesulfonate into the fiber suspension and waiting components in the fiber suspension to further react for 1 to 2 hours to prepare a reaction solution;

filtering the reaction solution under a reduced pressure to remove liquid from the reaction solution and prepare a modified fiber slurry;

adding the modified fiber slurry into a carbon black and an inorganic filler to prepare a modified fiber slurry mixture;

adding plasticized polar or non-polar rubber into an internal mixer and pressurized mixing for 1 to 2 minutes to prepare a rubber matrix, then adding the modified fiber slurry mixture into the rubber matrix, and further pressurized mixing for 1 to 2 minutes to prepare a mixed rubber compound;

extruding the mixed modified rubber compound from an open mill to prepare the modified rubber.

The present disclosure also provides a modified rubber prepared by the abovementioned method.

The present disclosure also provides a bulletproof and puncture resistant tire, including a tread, a belt ply, a buffer layer, a cord ply and an inner liner arranged in an order from outside to inside. The buffer layer is made by the abovementioned modified rubber.

The present disclosure provides a method for preparing a modified rubber, a modified rubber and a bulletproof and puncture resistant tire, wherein the modified rubber includes the high-performance short fibers, the buffer layer of the bulletproof and puncture resistant tire is made by the modified rubber, at least one of the tread, the belt ply, and the inner liner of the bulletproof and puncture resistant tire is made by the modified rubber, and the cord ply of the bulletproof and puncture resistant tire is formed by twisted high-performance long fibers, so that the bulletproof and puncture resistant tires not only has bullet-proof and puncture-resistant functions, but also has light weight and riding stability.

In order to make the abovementioned purposes, characteristics and advantages be more apparent and understandable, detailed descriptions accompanying preferred embodiments are given below.

DETAILED DESCRIPTION OF PREFERRED EMBODIMENTS

Figure 1:
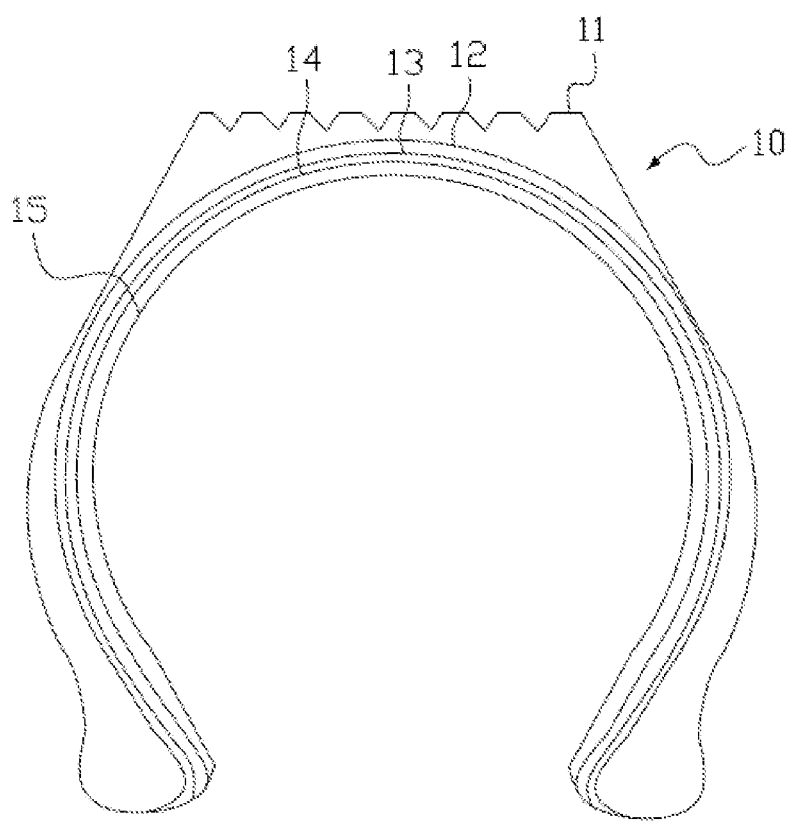
FIG. 1 is a schematic, cross-sectional view of a bulletproof and puncture resistant tire according to an embodiment of the present disclosure.

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

The present disclosure provides a method for preparing a modified rubber, which includes the following steps:

Adding high-performance short fiber into ethanol after the high-performance short fiber being irradiated in ultraviolet light for a period of time, stirring the mixture to prepare a uniformly dispersed fiber suspension;

Adding a coupling agent to the prepared fiber suspension, adjusting the pH value to a range from 8 to 9, waiting components in the fiber suspension to react at room temperature for 2 to 4 hours, adding sodium dodecyl benzene sulfonate (SDBS), waiting the components to further react for 1 to 2 hours to prepare a reaction solution, vacuum filtering the reaction solution under reduced pressure to remove liquid from the reaction solution and prepare a modified fiber slurry;

Adding carbon black and inorganic filler into the modified fiber slurry and uniformly mixing the mixture to prepare a modified fiber slurry mixture;

Adding plasticized polar or non-polar rubber to an internal mixer and pressurized mixing for 1 to 2 minutes to prepare a rubber matrix, and adding the modified fiber slurry mixture into the rubber matrix, further pressurized mixing for 1 to 2 minutes to prepare a mixed rubber compound;

Placing the mixed rubber compound to an open mill, extruding the mixed rubber compound from the open mill to obtain the modified rubber.

In the steps for preparing the modified rubber, irradiating the high-performance short fiber by the ultraviolet light is benefit to form a reactive group such as a hydroxyl group or an ester group on the surface of the high-performance short fiber, so that a transesterification reaction will be occurred between the high-performance short fiber and the coupling agent, and the molecules of the coupling agent are introduced into the molecular chains of the high-performance short fibers, and the alkyl chain on the coupling agent has good compatibility with the rubber matrix, thereby improving the compatibility of the high-performance short fiber and the rubber matrix. Generally speaking, fibers having a length from 35 mm to 150 mm can be called as short fibers. In this embodiment, the length of the high-performance short fiber is in a range from 35 mm to 150 mm.

However, the intensity of the ultraviolet light irradiated on the high-performance short fiber should not be too high and the irradiation duration should not be too long. If the intensity of the ultraviolet light is too high or the irradiation duration is too long, a large number of molecular chains of the high-performance short fiber will fracture, and the performance will be degraded. If the intensity of the ultraviolet light too low or the irradiation duration is too short, the grafting rate of the coupling agent is not high enough to improve the compatibility of the high-performance short fiber and the rubber matrix, and further is insufficient to reduce the agglomeration of the high performance short fiber. In this embodiment, the intensity of the ultraviolet light irradiated on the high-performance short fiber is preferably from 300 W to 450 W, and the irradiation duration is preferably from 25 to 40 seconds.

Furthermore, the high-performance short fiber is cut or broken by one or more of the following combinations: aramid fiber, polyparaphenylene benzobisoxazole fiber (PBO fiber), poly[2,5-dihydroxy-1,4-phenylpyridinium diimidazole fiber (M5 fiber), modified aramid fiber, modified polyparaphenylene benzobisoxazole fiber, and modified poly[2,5-dihydroxy-1,4-phenylpyridinium diimidazole fiber.

Furthermore, the coupling agent is selected from one or more of the following groups: γ-aminopropyltriethoxysilane, γ-glycidyloxypropyltrimethoxysilane, γ-(methacryloyloxy) propyltrimethoxysilane.

In the steps for preparing the modified rubber, when preparing the fiber suspension, the high-performance short fiber needs to be added to ethanol, and the solubility of the coupling agent in the ethanol is good, which is benefit for the occurrence of the grafting reaction between the coupling agent and the high-performance short fiber. In other embodiments, other solvents may be selected to prepare the fiber suspension. In addition, in the step of preparing the fiber suspension, high-speed stirring is required, and the stirring speed is preferably from 1200 r/min to 1500 r/min.

In the steps of preparing the modified rubber, a coupling agent is added to the obtained fiber suspension. The coupling agent is used to improve the compatibility of the high-performance short fiber with the polar or non-polar rubber so that the high-performance short fiber has good compatibility with the polar or non-polar rubber and makes the high performance short fiber has good mechanical properties.

In the steps of preparing the modified rubber, the modified fiber slurry is added to the carbon black and the inorganic filler to be uniformly mixed to prepare the modified fiber slurry mixture. In the modified fiber slurry mixture, the mass ratio of the modified fiber slurry, the carbon black, and the inorganic filler is preferably from 1:(0.6 to 0.8):(1 to 1.2). In the present embodiment, the inorganic filler is, for example, one or more of montmorillonite, attapulgite, kaolin or calcium carbonate.

In the steps of preparing the modified rubber, the plasticized polar or non-polar rubber is added to an internal mixer and pressurized mixed for 1 to 2 minutes to obtain a rubber matrix, and then the modified fiber slurry mixture is added to the rubber matrix and continue to be pressurized mixed for 1 to 2 minutes to prepare a mixed rubber compound. In this embodiment, the mass ratio of the modified fiber slurry mixture to the polar or non-polar rubber is preferably from 0.2:1 to 0.25:1.

In this embodiment, the plasticized polar or non-polar rubber is selected from one or more of the following groups: natural rubber, synthetic polyisoprene, butadiene rubber, styrene butadiene rubber, solution polymerized styrene-butadiene rubber, emulsion polymerized styrene-butadiene rubber, nitrile rubber, liquid rubber, halogenated butyl rubber, butadiene rubber, isoprene rubber, isoprene-isobutylene copolymer, ethylene-propylene-diene monomer (EPDM), chloroprene rubber, acrylate rubber, fluororubber, silicone rubber, polysulfide rubber, epichlorohydrin rubber, styrene-isoprene-butadiene terpolymer, hydrogenated acrylonitrile-butadiene rubber, isoprene-butadiene copolymer, and hydrogenated styrene-butadiene rubber.

In the steps of preparing the modified rubber, the mixed rubber compound is placed on an open mill and extruded from the open mill to prepare a modified rubber. The thickness of the modified rubber is preferably from 0.8 mm to 1.2 mm.

High-performance short fibers are prone to agglomerate and have poor compatibility with the rubber matrix during the modification of the polar or non-polar rubber. The active group is introduced into the high-performance short fiber by ultraviolet light irradiation so that the high-performance short fiber could chemically react with the coupling agent, and the molecules of the coupling agent is introduced into the molecular structure of the high performance short fiber, which can fully improve the compatibility with the polarized or non-polarized rubber matrix, meanwhile, the molecular chain of the coupling agent is physically entangled with sodium dodecylbenzene sulfonate, and the coupling agent is combined with sodium dodecylbenzene sulfonate, and furthermore, due to the same charge repel effect between the sodium benzene sulfonates, the high-performance short fibers mutually repel each other, thereby avoiding agglomeration generated between the high-performance short fibers, so that the high-performance short fibers are more uniformly dispersed in the rubber matrix.

Embodiments of the present disclosure also provide a modified rubber which is prepared by the method as described above.

FIG. 1 is a schematic, cross-sectional view of a bulletproof and puncture resistant tire according to an embodiment of the present disclosure. Referring to FIG. 1, the bulletproof and puncture resistant tire 10 includes a tread 11, a belt ply 12, a buffer layer 13, a cord ply 14 and an inner liner 15 which are disposed in an order from outside to inside. The buffer layer 13 of the bulletproof and puncture resistant tire 10 is made by the abovementioned modified rubber, and at least one of the tread 11, the belt ply 12 and the inner liner 15 of the bulletproof and puncture resistant tire 10 is made by the abovementioned modified rubber. In the present embodiment, the buffer layer 13 and the cord ply 14 extend to the entire sidewall of the bulletproof and puncture resistant tire 10. Due to the side surface of the bulletproof and puncture resistant tire 10 is weak and easily punctured by bullets and piercing objects, the design that the buffer layer 13 and the cord ply 14 extend to the entire sidewall of the bulletproof and puncture resistant tire 10 is benefit for preventing the sidewall of the bulletproof and puncture resistant tire 10 from being punctured.

The buffer layer 13 is a rubber layer located between the belt ply 12 and the cord ply 14, and is mainly used to absorb the impacts transmitted from the tread 11, reduce the damage of the cord ply 14 and withstand the shear stress generated due to inertia of the bulletproof and puncture resistant tire 10 during running or sudden stop of the vehicle. In this embodiment, the modified rubber is used to prepare the buffer layer 14 of the bulletproof and puncture resistant tire 10, which can effectively absorb a part of the energy of the piercing object, and reduce the damage of the piercing object to the cord ply 14 and the inner wall of the bulletproof and puncture resistant tire 10.

In other embodiments, the buffer layer 13 may also be made of a foam material selected from one or more of the group consisting of a polyurethane foam material, a polystyrene foam material, a polypropylene foam material, or an ethylene-vinyl acetate copolymer foam material.

Furthermore, the cord ply 14 of the bulletproof and puncture resistant tire 10 is woven from a high-performance fiber bundle made of twisting high-performance long fibers. The high-performance long fiber is selected from one or more of the group consisting of aramid fiber, polyparaphenylene benzobisoxazole fiber, poly[2,5-dihydroxy-1,4-phenylpyridinium diimidazole fiber, modified aramid fiber, modified polyparaphenylene benzobisoxazole fiber and modified poly[2,5-dihydroxy-1,4-phenylpyridiniidiimidazole fibers. The cord ply 14 is formed from weaving the high-performance fiber bundles with high modulus, high strength and high performance to further prevent the piercing object from continue penetrating into the tire, thereby preventing the bulletproof and puncture resistant tire 10 from being pierced.

Figure 2:
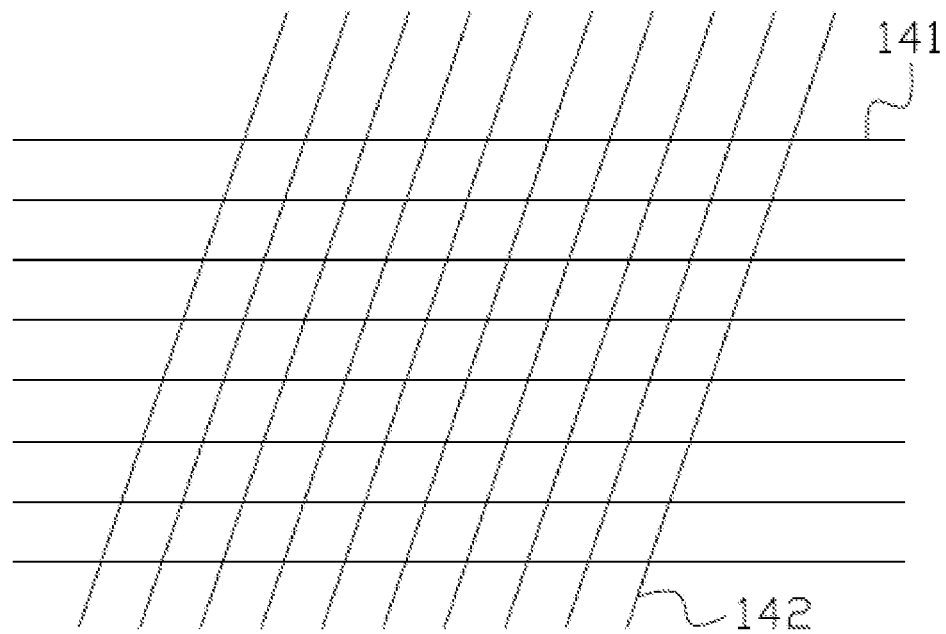
FIG. 2 is a schematic, structural view of a cord ply according to an embodiment of the present disclosure.

FIG. 2 is a schematic, structural view of a cord ply according to an embodiment of the present disclosure. Referring to FIG. 2, the cord ply 14 of the bulletproof and puncture resistant tire 10 includes a plurality of warp threads 141 spaced apart and parallel to each other, and a plurality of weft threads 142 spaced apart and parallel to each other. The warp threads 141 are disposed to intersect with the weft threads 142 respectively. Each two adjacent warp threads 141 intersect and connect with two adjacent weft threads 142 respectively to form a parallelogram, and the parallelogram structure of the cord ply 14 makes it have good deformability. In the present embodiment, the weaving angle of the warp threads 141 and the weft threads 142 is preferably from 30° to 60°, and the fineness of the high-performance fiber bundle is preferably from 50 D to 300 D.

Both of the warp threads 141 and the weft threads 142 are twisted high-performance fiber bundles. Twisting is a process of winding a raw material silk or a raw material fiber into a thread. One thread is composed of a plurality of silks or fibers, and the silks or fibers are entangled with each other to make the thread more solid and delicate. The tighter the silks or fibers are wound, the higher the twist is, and the woven fabric is relatively tight, with good drape feeling and good fastness. If there is no twist, there is no thread, the silk and the silk or the fiber and the fiber are not entangled, which causes the fabric to be slack, the drape to be poor, and the fastness to be poor. In this embodiment, each of the warp threads 141 and each of the weft threads 142 are high-performance fiber bundles formed by twisting a plurality of high-performance long fibers, the high-performance long fibers have high strength and high modulus, and therefore, the cord ply 14 woven by the warp threads 141 and the weft threads 142 has extremely high strength and modulus.

Furthermore, the line distances between adjacent warp threads 141 or adjacent weft threads 142 determine the weave density of the cord ply 14 formed by the high performance fiber bundles. If the line distance is too large, the weaving density is too small, the strength of the cord ply 14 is limited and could not effectively prevent the piercing object from penetrating, and the bullet-proof and puncture-resistant effect is not good. If the line distance is too small, the weaving density is too large, and the cost of the cord ply 14 is increased on one hand. On the other hand, the degree of deformation of the cord ply 14 is too low, and the riding comfort and safety of the vehicle are not good. Therefore, in this embodiment, the line distance between adjacent two warp threads 141 is preferably from 0.3 mm to 1 mm, and the line distance between adjacent two weft threads 142 is preferably from 0.3 mm to 1 mm.

Referring to FIG. 2, both of the warp threads 141 and the weft threads 142 of the cord ply 14 are twisted high-performance fiber bundles, and the parallelogram structure formed by weaving the warp threads 141 and the weft threads 142 causes the cord ply 14 to have high strength and high modulus, and the parallelogram structure weaved by the warp threads 141 and the weft threads 142 has excellent deformability, which can meet the requirements of tire deformation, driving comfort and safety, as well as high modulus and high strength.

In the method for preparing the modified rubber, the modified rubber and the bulletproof and puncture resistant tire of the present disclosure, the high-performance short fibers are added to the modified rubber, the buffer layer 13 of the bulletproof and puncture resistant tire 10 applies the modification rubber, at least one of the tread 11, the belt ply 12 and the inner liner 15 of the bulletproof and puncture resistant tire 10 applies the modified rubber, and the cord ply 14 of the bulletproof and puncture resistant tire 10 is weaved by the twisted high-performance long fibers so that the bulletproof and puncture resistant tire 10 not only has bullet-proof and puncture-resistant function, but also has light weight and riding stability.

INDUSTRIAL APPLICABILITY

In the method for preparing the modified rubber, the modified rubber and the bulletproof and puncture resistant tire of the present disclosure, the high-performance short fibers are added to the modified rubber, the buffer layer 13 of the bulletproof and puncture resistant tire 10 applies the modification rubber, at least one of the tread 11, the belt ply 12 and the inner liner 15 of the bulletproof and puncture resistant tire 10 applies the modified rubber, and the cord ply 14 of the bulletproof and puncture resistant tire 10 is weaved by the twisted high-performance long fibers so that the bulletproof and puncture resistant tire 10 not only has bullet-proof and puncture-resistant function, but also has light weight and riding stability.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for preparing a modified rubber, comprising the steps of:
    irradiating high-performance short fibers by ultraviolet light;
    adding the irradiated high-performance short fibers to ethanol and stirring to prepare a uniformly dispersed fiber suspension;
    adding a coupling agent to the prepared fiber suspension;
    adjusting a pH value of the fiber suspension to a range from 8 to 9, and waiting for 2 to 4 hours at room temperature;
    adding sodium dodecylbenzenesulfonate into the fiber suspension and waiting for 1 to 2 hours to prepare a reaction solution;
    filtering the reaction solution under a reduced pressure to remove liquid from the reaction solution and prepare a modified fiber slurry;
    adding the modified fiber slurry into a carbon black and an inorganic filler to prepare a modified fiber slurry mixture;
    adding plasticized polar or non-polar rubber to an internal mixer and pressurized mixing for 1 to 2 minutes to prepare a rubber matrix;
    adding the modified fiber slurry mixture to the rubber matrix and further pressurized mixing for 1 to 2 minutes to prepare a mixed rubber compound;
    extruding the rubber compound from an open mill to prepare the modified rubber.

2. The method for preparing a modified rubber according to claim 1, wherein the intensity of the ultraviolet light for irradiating the high-performance short fibers is from 300 W to 450 W and an irradiation duration is from 25 to 40 seconds.

3. The method for preparing a modified rubber according to claim 1, wherein a stirring speed is from 1200 to 1500 r/min.

4. The method for preparing a modified rubber according to claim 1, wherein a mass ratio of the modified fiber slurry, the carbon black and the inorganic filler is 1:(0.6 to 0.8):(1 to 1.2).

5. The method for preparing a modified rubber according to claim 4, wherein the inorganic filler is one or more of montmorillonite, attapulgite, kaolin or calcium carbonate.

6. The method for preparing a modified rubber according to claim 1, wherein the polar or non-polar rubber is selected from one or more of the group consisting of natural rubber, synthetic polyisoprene, butadiene rubber, styrene butadiene rubber, solution polymerized styrene-butadiene rubber, emulsion polymerized styrene-butadiene rubber, nitrile rubber, liquid rubber, halogenated butyl rubber, butadiene rubber, isoprene rubber, isoprene-isobutylene copolymer, ethylene-propylene-diene monomer, chloroprene rubber, acrylate rubber, fluororubber, silicone rubber, polysulfide rubber, epichlorohydrin rubber, styrene-isoprene-butadiene terpolymer, hydrogenated acrylonitrile-butadiene rubber, isoprene-butadiene copolymer and hydrogenated styrene-butadiene rubber.

7. The method for preparing a modified rubber according to claim 1, wherein the high-performance short fiber is cut or broken by one or more of the following combinations: aramid fiber, polyparaphenylene benzobisoxazole fiber, poly[2,5-dihydroxy-1,4-phenylpyridinium diimidazole fiber, modified aramid fiber, modified polyparaphenylene benzobisoxazole fiber and modification poly[2,5-dihydroxy-1,4-phenylpyridinium diimidazole fiber.

8. The method of preparing a modified rubber according to claim 1, wherein the high-performance short fibers have a length of 35 mm to 150 mm.

9. The method for preparing a modified rubber according to claim 1, wherein the coupling agent is selected from one or more of the group consisting of
    γ-aminopropyltriethoxysilane, γ-glycidyloxypropyltrimethoxysilane, and
    γ-(methacryloyloxy)propyltrimethoxysilane.

10. The method of preparing a modified rubber according to claim 1, wherein the modified rubber has a thickness of 0.8 mm to 1.2 mm.

11. The method for preparing a modified rubber according to claim 1, wherein a mass ratio of the modified fiber slurry mixture to the polar or non-polar rubber is from 0.2:1 to 0.25:1.

\* \* \* \* \*